United States Patent
Pandolfi

(10) Patent No.: US 6,289,678 B1
(45) Date of Patent: Sep. 18, 2001

(54) ENVIRONMENTAL SYSTEM FOR RUGGED DISK DRIVE

(75) Inventor: Richard Pandolfi, Melville, NY (US)

(73) Assignee: Phoenix Group, Inc., Hauppauge, NY (US)

( * ) Notice: Subject to any disclaimer, the term of this patent is extended or adjusted under 35 U.S.C. 154(b) by 0 days.

(21) Appl. No.: 09/339,852

(22) Filed: Jun. 25, 1999

Related U.S. Application Data

(63) Continuation-in-part of application No. 09/204,233, filed on Dec. 3, 1998, now abandoned.

(51) Int. Cl.⁷ .............................. F25B 21/02; H05K 5/00
(52) U.S. Cl. .............................................. 62/3.2; 361/687
(58) Field of Search .................... 62/3.2, 259.2, 62/3.7; 361/687, 700

(56) References Cited

U.S. PATENT DOCUMENTS

| | | | |
|---|---|---|---|
| 3,757,530 | * | 9/1973 | Doyle et al. . |
| 4,642,715 | | 2/1987 | Ende . |
| 4,812,733 | * | 3/1989 | Tobey . |
| 5,456,081 | * | 10/1995 | Chrysler et al. .......................... 62/3.7 |
| 5,596,483 | * | 1/1997 | Wyler .................... 361/687 |
| 5,623,597 | * | 4/1997 | Kikinis . |
| 5,676,199 | * | 10/1997 | Lee . |
| 5,704,212 | * | 1/1998 | Erler et al. .............................. 62/3.2 |
| 5,724,818 | * | 3/1998 | Iwata et al. .............................. 62/3.7 |
| 5,757,615 | * | 5/1998 | Donahoe et al. ..................... 361/687 |
| 5,827,424 | * | 10/1998 | Gillis et al. .......................... 62/3.2 X |
| 5,982,616 | * | 11/1999 | Moore .................................. 361/687 |
| 6,069,792 | * | 5/2000 | Nelik .................................... 361/687 |

* cited by examiner

Primary Examiner—Henry Bennett
Assistant Examiner—Chen Wen Jiang
(74) Attorney, Agent, or Firm—Venable; John P. Shannon; Chad C. Anderson

(57) ABSTRACT

A hard disk system having a disk housing shock mounted in an environmental housing employs a device to transfer heat from the disk housing while avoiding any mechanical connection that would impose significant rigidity between the disk housing and the environment housing so as to defeat the shock mounting. In one embodiment, a Peltier effect heat pump has a cold side in contact with the disk housing and a hot side in contact with heat-conducting spring fingers contacting the environmental housing. In another embodiment, a fan is positioned in a space between the outside of the disk housing and the inside of the environmental housing to circulate air around the disk housing, while a Peltier effect heat pump moves heat to the environmental housing. In yet another embodiment, the fan is positioned in the space between the disk housing and the environmental housing, and the Peltier effect heat pump has a cold side in contact with an exterior surface of the environmental housing and a hot side in contact with a heat sink. In still another embodiment, a flexible heat pipe comprising a shell containing a low vapor-point liquid is positioned in the space between the outside of the disk housing and the inside of the environmental housing with respective ends in contact with each of the housings.

11 Claims, 3 Drawing Sheets

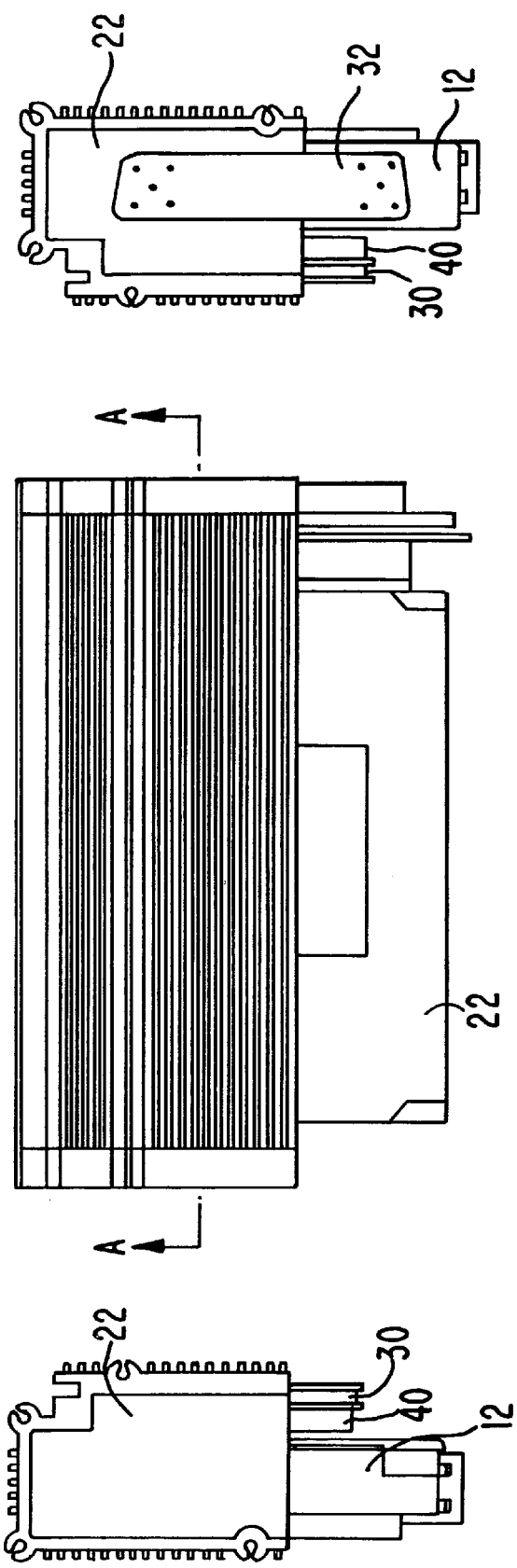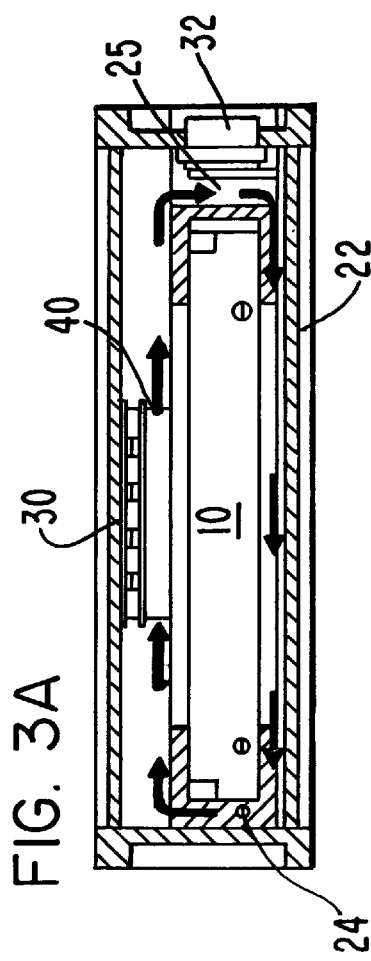

ENVIRONMENTAL SYSTEM FOR RUGGED DISK DRIVE

CROSS REFERENCE TO RELATED APPLICATION

This is a continuation-in-part of Ser. No. 09/204,233 filed on Dec. 3, 1998, now abandoned.

BACKGROUND OF THE INVENTION

1. Field of the Invention

This invention relates to an improved environment system for sealed hard disk assemblies, and more particularly to a system that extends the operating life of the hard disk assembly when subject to high operating temperatures.

2. Description of the Prior Art

FIG. 1 schematically illustrates a commercially available sealed, hard disk drive and its environment control enclosure that makes the disk drive suitable for use in rugged applications where it is subject to high temperature and mechanical shock and/or vibration. One such sealed hard disk and environment control enclosure is available from Miltope Corporation and referred to by Miltope as the LPC Series of rugged high capacity, low profile, shock and vibration resistant disk drives employing sealed, disk drive cartridges. These products are ruggedized for operation in severe field environment where extremes of temperature, shock, vibration, humidity and air pressure are common. They are designed for "on-the-move" operation in tracked and wheeled vehicles, as well as airborne and shipboard applications. As illustrated in FIG. 1, this prior art disk drive includes a commercially available sealed hard disk drive 10, such as the sealed hard disk drive available from Toshiba, IBM Corp., Seagate and others. Such hard disk drives include a disk housing 12, which is sealed except for a very small opening 14 that allows a small amount of gas sealed in the housing 12 to egress and ingress during disk start up and shut down respectively. A hard disk 16 within the housing 12 rides on a spindle 17 driven by a motor 18, both of which are also located within the housing 12. A flying head 20 is servo positioned over a desired track on the disk 16 in order to read from and write data onto the disk. The housing 12 is supported in a sealed environmental housing 22 by resilient mounts 24, i.e. device to mechanically isolate rapid acceleration due to shock or vibration, for example, of the environmental housing 22 from the disk housing 12. The environmental housing 22 is an air tight aluminum housing filled with an inert gas or, if desired, with dry or low humidity air. This sealed aluminum housing 22 can also house a control electronics module 30. An embedded closed loop servo system compensates for temperature variation, ensuring reliable head positioning. An air tight connector 32 provides a signal and power interface between the components inside the sealed environmental housing 22 and connections (not shown) outside of the housing. As will be appreciated by those skilled in the art, hard disk drives of the type shown schematically in FIG. 1, store multi-gigabytes of data on a 2.5 inch or 3.5 inch disk, with the environmental housing 22 having a foot print of approximately 5 inches by 8 inches by 1.5 inches deep for a 3.5 inch disk, or appropriately smaller for a 2.5 inch or smaller hard drive. The expected mean time between failures is normally in excess of 100,000 hours in a normal environment application.

While quite satisfactory in normal office type operation, the hard disk drive systems of the type shown in FIG. 1 have experienced a significant increase in failures when operating at very high temperatures.

SUMMARY OF THE INVENTION

An object of this invention is the provision of a hard disk drive system with a small footprint and rugged shock resistance (i.e. of the type described in connection with FIG. 1) but which can operate in a high temperature and/or high humidity environment without a significant decrease in mean time between failure.

Applicant has identified the cause of an increase in failure rate of hard disk systems operating in high temperature environments as the lubricant used to lubricate the disk drive motor 18. Oil from the spindle motor has been found to wick and/or vaporize out of the motor bearing when operated at high temperatures. The lubricant has been found to form a deposit on the flying head and disk surface, eventually causing it to contact the disk and cause permanent damage as well as cause spindle motor bearing failure which causes permanent damage. In addition, when the hard drive is turned on, internal air is expelled as the air is heated through the breathing hole/filter generally used in disk drives of the magnetic media type due to the high speed rotation of the disk platter. When a drive is powered off, and cools down, make-up air is drawn in. If humidity is present, the make-up air can contain humidity or other contaminants which can deposit residue on the read/write head and disk platters, which can cause unstable flying of the read/write head and cause damage to the unit which can result in permanent failure. In addition, the disk drive electronics have caused circuit drifts and failures at temperatures above 135° F. Applicant's solution to the problem that applicant has identified is to provide arrangement inside the environmental housing to transfer heat away from the hard disk drive without necessarily increasing the overall footprint of the system or coupling shock or vibration from the environmental housing to the disk drive. In some embodiments of the invention, the arrangement includes a thermoelectric heat pump module that uses the Peltier effect to move heat. As will be appreciated by those skilled in the art, such solid state heat pumps are commercially available, for example from Melcor corporation. These heat pumps consist of a number of p type and n type pairs connected electrically in series and sandwiched between two ceramic plates. When connected to a d.c. source, current causes heat to move from one plate to the other, creating a relatively hot side and a relatively cool side. In one embodiment of the invention, the cool side of the solid state heat pump engages the hard disk housing, and resilient heat conductors thermally connect the hot side to the environmental housing without materially coupling shock or vibration. In another embodiment, the hot side of the solid state heat pump contacts the inside wall of the environmental housing, and a fan circulates the gas in the environmental housing across the cool side of the heat pump and the hard disk housing. In yet another embodiment, a fan circulates the gas along a wall of the environmental housing, and the cold side of the heat pump is in heat conducting contact with an exterior surface of the wall. The hot side of the heat pump is in heat conducting contact with a heat sink.

In still another embodiment, the heat pump is omitted in favor of a heat pipe. Heat pipes have been used to cool aircraft power supplies and densely packed electronics in portable computers. One particular type of heat pipe, manufactured by Thermacore, Inc. of Lancaster, Pa., consists primarily of a porous material soaked in a low vapor-point liquid, such as acetone or methanol. When the liquid is heated, it vaporizes and is forced to the center of the pipe. It then travels to one end, where it condenses and releases its heat. At that point, the cooled liquid is wicked back to where it started, and the process repeats. The heat pipe can be generally U-shaped, with one side being secured to the hard disk housing, and the other side being secured to an interior surface of the environmental housing. Flexibility is provided in the heat pipe by, for example, a flexible bellows between the two sides of the heat pipe. Heat from the side in contact with the hard disk housing flows through the heat pipe to the side in contact with the environmental enclosure.

BRIEF DESCRIPTION OF THE DRAWINGS

The foregoing and other objects, aspects and advantages will be better understood from the following detailed description of a preferred embodiment of the invention, in which like reference numbers have been used to identify like part in different figures, and in which:

FIG. 3 is a plan view showing the top of the environmental housing of a disk drive system in accordance with another embodiment of the invention.

FIG. 3A is a sectional view along the line A—A of FIG. 3.

FIG. 3B is a left side view, with parts broken away, of the system shown in FIG. 3.

FIG. 3C is a right side view of the system shown in FIG. 3.

DETAILED DESCRIPTION OF A PREFERRED EMBODIMENT

Figure 1:
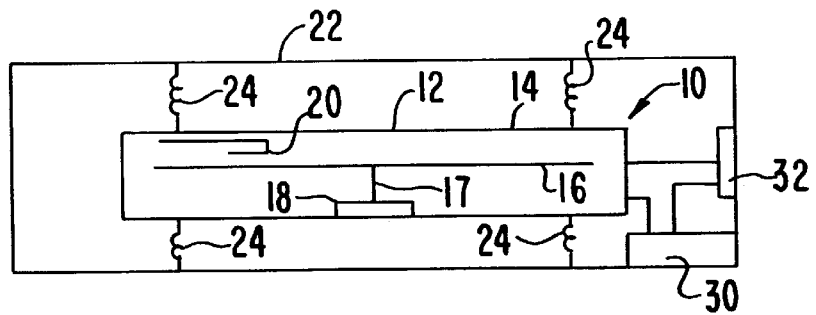
FIG. 1 is a schematic illustration of a prior art environmentally protected hard disk system.

Referring now to FIGS. 2, 2A, 2B and 2C, it shows a disk drive system similar to that shown in FIG. 1 with a hard disk drive 10 supported in an environmental housing 22 by a resilient mounting system 24. The housing 22 includes fins or ribs 23 in order to increase the outer surface area of the housing and to thereby increase the rate of heat transfer from the outer surface of the housing by connections. The mounting system 24 shown here is a molded visco-elastic pad that partially surrounds the disk drive housing 12 and fits tightly in the environmental housing 22 in order to protect the hard drive 10. The thermally sealed connector 32 has a flex circuit interface to the hard disk drive 10.

In this embodiment of the invention, one side of a solid state heat pump 30 contacts the outer surface of the hard disk housing 12 and is secured thereto by means of a thermally conductive epoxy. Direct current power, which is coupled to the heat pump 30 via the connector 32, is of such a polarity that the side of the heat pump contacting the housing 12 is the cold side and the hot surface of the heat pump is on the side away from the hard disk housing 12. Flexible, thermally conductive members 36 conduct heat from the hot surface of the heat pump to the inner surface of the environmental housing, which in turn conducts the heat to the outside environment. Here it will be appreciated that the heat conductive members 36 can be any one of a wide variety of different designs with the purposes of conducting heat while providing little or no mechanical coupling between the environmental housing 22 and the hard disk housing 12. For example, curved ribbons of copper, resilient copper rings or copper spring fingers can be used.

FIGS. 3, 3A, 3B and 3C show an alternative embodiment of the invention. Here the hot side of the solid state heat pump 30 is secured by, for example, a thermally conductive epoxy, to the inner surface of the environmental housing 22. A fan 40 is secured to the cold side of the solid state heat pump 30. Heat is transferred by conduction directly from the hot side of the heat pump 30 to the environmental housing 22 and from the environmental housing 22 to the surrounding environment. The fan 40 circulates the gas in the environmental housing over the cold side of the solid state heat pump 30 and over the hard disk housing 12, cooling the hard disk housing by convection. The mounting system 24 has openings 25 to allow the circulation of gas around the disk drive housing 12 as within the environmental housing 22. Power is coupled for both the fan 40 and the heat pump 30 via the sealed connector 32 from outside the housing 22.

Figure 4:
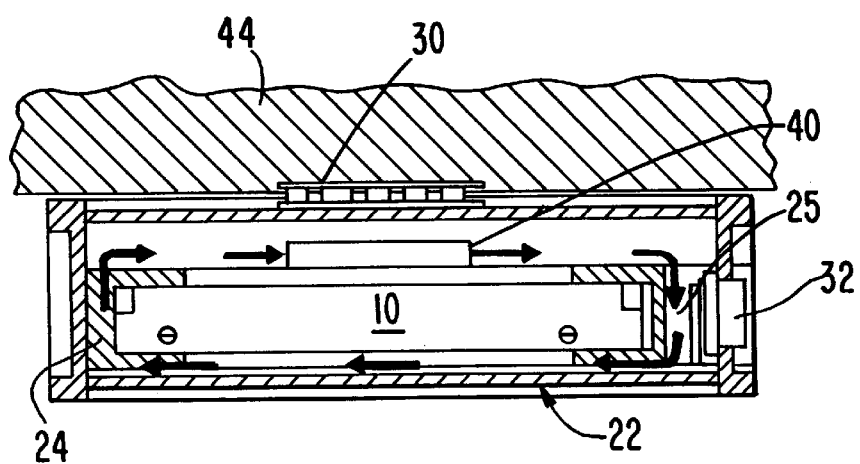
FIG. 4 is a sectional view of yet another embodiment of the present invention.

As can be seen from FIG. 4, in yet another embodiment of the invention, the fan 40 is positioned in a space between the hard disk drive 10 and a wall of the environmental housing 22 to produce a cooling flow of gas along an inner surface of the wall. The cold side of the solid state heat pump 30 is in heat conductive contact with an outer surface of the wall of the environmental housing 22, and the hot side of the heat pump 30 is in heat conductive contact with a heat sink 44, which can be, for example, a relatively large mass of metal having a cooler temperature than the hard disk drive 10.

Figure 5:
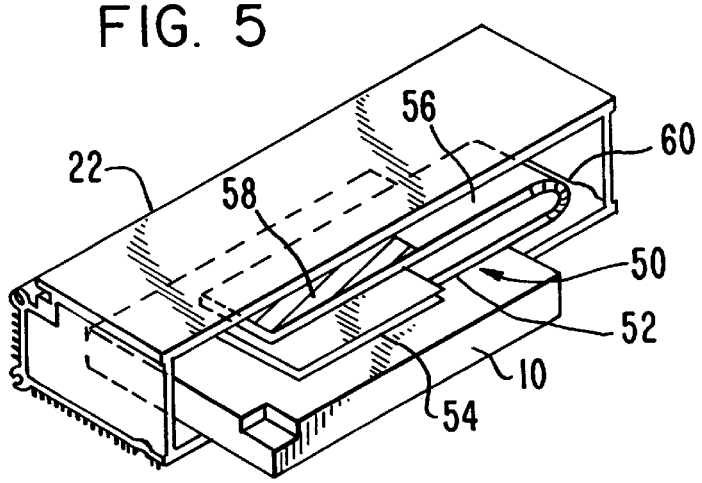
FIG. 5 is a perspective view of the environmental housing of a disk drive system in accordance with still another embodiment of the invention, with a part of the housing removed.
Figure 2C:
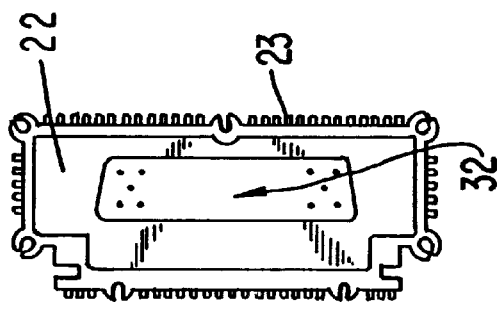
FIG. 2C is a right side view of the system shown in FIG. 2.
Figure 2:
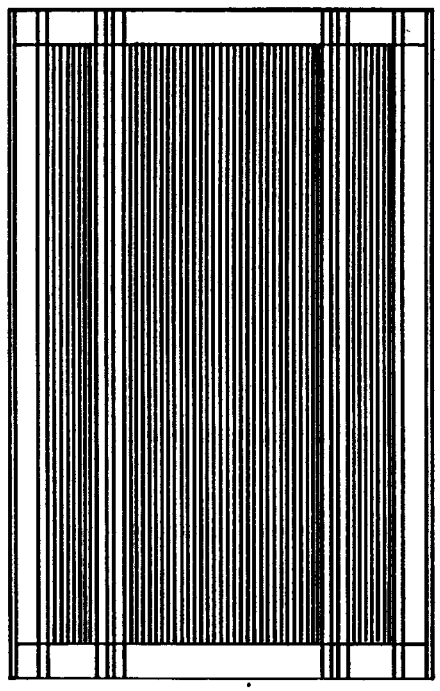
FIG. 2 is a plan view showing the top of the environmental housing of a disk drive system in accordance with one embodiment of the invention.
Figure 2B:
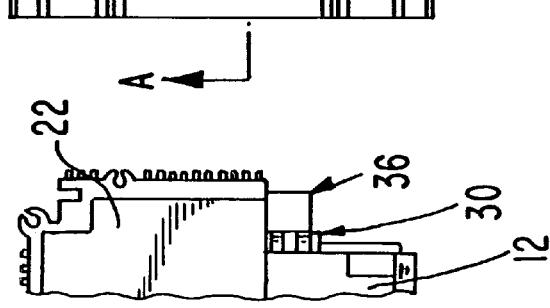
FIG. 2B is a left side view, with parts broken away, of the system shown in FIG. 2.
Figure 2A:
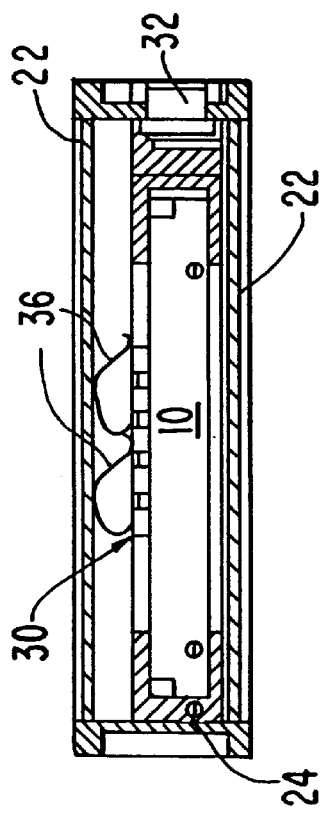
FIG. 2A is a sectional view along the line A—A of FIG. 2.

FIG. 5 shows still another embodiment of the invention, in which half of the environmental housing 22 has been removed, so that internal parts can be seen. The internal parts include the hard disk drive 10 supported in the environmental housing 22 by the resilient mounting system 24 (not shown in FIG. 5), with a space provided between the top of the hard disk drive and an inside surface of the top of the environmental housing. The environmental housing 22 is filled with an inert gas. A heat pipe 50 is positioned in the space between the hard disk drive 10 and the environmental housing 22. The heat pipe 50 includes a first portion 52 having a large flat surface 54 in contact with the hard disk drive 10 for heat transfer from the hard disk drive to the heat pipe. The heat pipe 50 also has an opposite portion 56 having a large flat surface 58 in contact with an interior surface of the environmental enclosure 22 for heat transfer from the heat pipe to the environmental enclosure. The portions 52 and 56 of the heat pipe 50 can be secured to the hard disk drive 10 and the environmental enclosure 22, respectively, in a conventional manner, such as by an epoxy. The heat pipe 50 is flexible between the first and second portions 52 and 56, such as by the use of a flexible bellows portion 60 between the first and second portions. In the illustrated embodiment, the heat pipe 50 has a generally U-shape and includes an outer shell which can be made of, for example, stainless steel or copper. Heat transferred into the first portion 52 of the heat pipe 50 from the hard disk drive 10 vaporizes a low vapor-point liquid in that portion of the heat pipe and causes it to flow to the opposite portion 56 of the heat pipe, where the liquid transfers its heat through the outer shell of the heat pipe at the second portion 56 to the environmental enclosure 22 and condenses. The condensed, cooled liquid is wicked back to the first portion 52, and the process repeats.

While the invention has been described in terms of several preferred embodiments, those skilled in the art will recognize that the invention can be practiced with modification within the spirit and scope of the appended claims.

Having thus described our invention, what we claim as new and desire to secure by Letters Patent is as follows:

1. In a ruggedized hard disk system in which a hard disk, its motor drive, and its flying head are enclosed in a disk housing and that disk housing is shock mounted by a shock mounting means in an environmental housing, an improvement comprising:

an arrangement supplementing passive heat transfer from the disk housing without interposing a significantly rigid connection from the disk housing to the environmental housing, the arrangement including a solid state heat pump as an active environmental housing, the arrangement including a solid state heat pump as an active heat transfer device, the improvement further comprising visco-elastic members providing the shock mounting means.

2. In a ruggedized hard disk system as in claim 1, wherein said solid state heat pump has a cold side in contact with said disk housing and a hot side, and wherein a thermal conductor extends from the hot side of said heat pump to a wall of said environmental housing to conduct heat from said hot side to said wall without providing significant rigidity between said wall and said heat pump.

3. In a ruggedized hard disk system as in claim 2, the improvement further comprising said environmental housing being an aluminum enclosure having fins for heat transfer enhancement.

4. In a ruggedized hard disk system as in claim 1, wherein said solid state heat pump has a hot side in contact with an interior wall surface of said environmental housing and a cold side, the arrangement further comprising a fan in said environmental housing, said fan being positioned to produce a cooling flow along said disk housing so that heat is transferred from said disk housing by convection to said cold side and from said hot side to said interior wall surface by thermal conduction.

5. In a ruggedized hard disk system as in claim 4, the improvement further comprising said environmental housing being an aluminum enclosure having fins for heat transfer enhancement.

6. In a ruggedized hard disk system as in claim 4, the improvement further comprising visco-elastic members providing the shock mounting.

7. In a ruggedized hard disk system as in claim 1, wherein said active heat transfer device is a heat pipe in said environmental housing, the heat pipe having a first portion in contact with said disk housing, and an opposite portion in contact with said environmental housing to conduct heat from said disk housing to said environmental housing, said heat pipe being flexible between said first and second portions.

8. The hard disk system of claim 7, wherein the heat pipe comprises a shell containing a low vapor-point liquid.

9. The hard disk system of claim 8, wherein the shell has a flexible bellows portion between the first portion and the opposite portion of the heat pipe.

10. The hard disk system of claim 7, wherein the heat pipe has a flexible bellows portion between the first portion and the opposite portion.

11. The hard disk system of claim 7, wherein the heat pipe is U-shaped, and the first portion and the opposite portion are at opposite ends of the 'U'.

* * * * *